July 25, 1939. B. H. BROWALL 2,167,562
DOUBLE-ACTING AUTOMATIC SLACK ADJUSTER FOR BRAKES
Filed Nov. 30, 1937 2 Sheets-Sheet 2
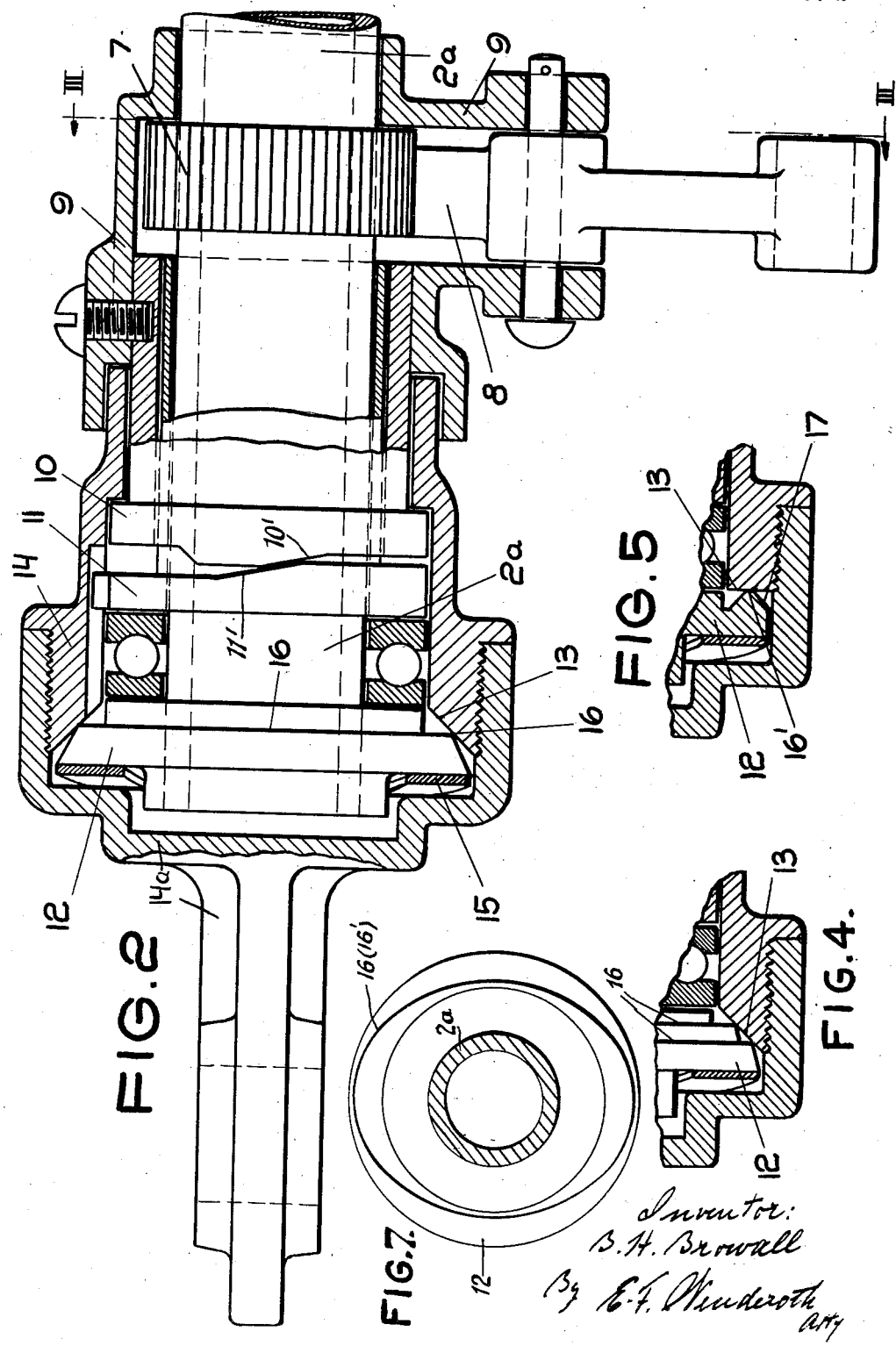

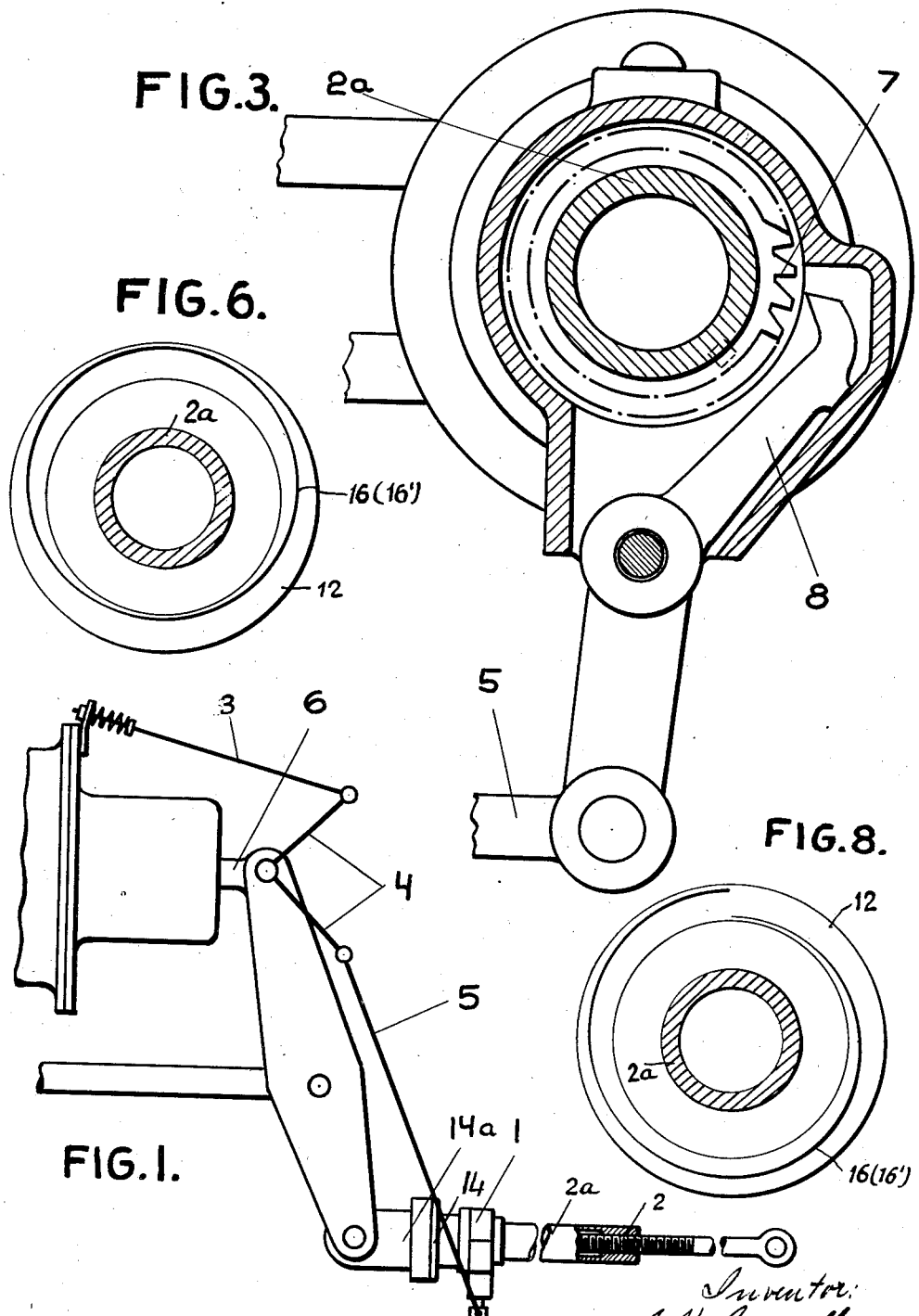

Patented July 25, 1939

2,167,562

UNITED STATES PATENT OFFICE 2,167,562

DOUBLE-ACTING AUTOMATIC SLACK ADJUSTER FOR BRAKES

Bert Henry Browall, Malmo, Sweden, assignor to Svenska Aktiebolaget Bromsregulator, Malmo, Sweden, a corporation of Sweden Application November 30, 1937, Serial No. 177,333
In Germany December 4, 1936

11 Claims. (Cl. 188—202)

This invention relates to double-acting automatic slack adjusters for brakes in which the brake action is obtained by sliding friction between braking elements such as the brake shoes and the wheels of a braked railway vehicle, the term "double-acting" being used to indicate such automatic slack adjusters which are capable not only of automatically adjusting the brake in the direction for reducing the slacks thereof when they become too large due, for instance, to wear of the brake shoes, but also of automatically adjusting the brake in the opposite direction for increasing the slacks to their normal value when they become too small, for instance, after renewal of worn brakes shoes.

More particularly the invention relates to the type of such automatic double-acting slack adjusters, which comprises a screw-connection forming part of the brake rigging, and an actuating device for said screw-connection, and in which said screw-connection has a pitch of such an order as to make the same non-selflocking so that one of the two aforesaid functions of the slack adjuster, namely the function of increasing too small slacks, is effected by a rotation caused by the torque arising in said screw-connection as a result of a commencing braking stress in the brake rigging when applying the brake.

Obviously the aforesaid rotation in the slack increasing direction must not be unlimited, but must continue only to the extent required for obtaining the desired length of the application movement of the brake. Consequently, the actuating device of the slack adjuster must perform two functions, namely not only the function of imparting to the screw-connection of the slack-adjuster the rotation in the slack reducing direction required for compensating the effect of wear of the brake shoes on the length of the brake application movement, but also the function of controlling a means for locking, in a predetermined position of the brake application movement, the screw-connection against rotation in the slack increasing direction under the action of the commencing braking stress in the brake rigging.

While a pawl and a ratchet wheel might be used for performing this locking of the screw-connection against rotation in the slack increasing direction it has been preferred, however, because of the fact that engagement of the pawl with the ratchet wheel during the slack increasing operation of the slack adjuster might give rise to undesirable shocks, to stop the slack increasing rotation by friction. To this end a member connected to and rotatable with the screw-connection and usually of annular form is provided with a friction surface, for instance a conical one, which at the moment in which the rotation in the slack increasing direction is to be stopped is brought in contact with a corresponding friction surface on a non-rotatable member of the slack adjuster. As a matter of course the two friction members are made from appropriate materials for avoiding seizing of the friction clutch formed by the friction surfaces, one member, for instance, being made from steel and the other from cast iron.

This known arrangement, however, suffers from the risk of failing in a certain respect, whereby the operation of the slack-adjuster becomes more or less uncertain. Materials appropriate for avoiding seizing of the friction clutch usually have the reverse quality of easily becoming smoother during work. Further, if a lubricating agent should gain access to the friction surfaces, it may happen that the coefficient of friction between the friction surfaces decreases so far that the intended function of the friction clutch becomes uncertain. On the other hand it is often impossible to prevent access of a lubricating agent to the friction surfaces, because of the fact that it may be desirable to use a lubricant as an anticorrosive on the friction surfaces or because of the fact that certain parts at least of the slack adjuster require lubrication, and lubricant from such parts may find its way to the friction surfaces of the friction clutch. In all cases the intended function of the slack adjuster is put in jeopardy.

The principal object of the invention is to provide an improved construction of the aforesaid friction clutch in automatic slack adjusters of the type above referred to, for ensuring a reliable function thereof even in the presence of a plentiful quantity of a lubricant.

Another object of the invention is to make the function of the friction clutch practically independent of the presence or absence of lubricants on the friction surfaces.

These objects are obtained in general by giving the friction surface on one of the clutch members the shape of an edge or ridge for frictional contact of substantially linear character with the friction surface on the other clutch member.

The above and other objects and advantages of the invention will be more clearly understood upon reference to the following specification and the drawings accompanying the same.

In the drawings:

Fig. 1 is a plan view, partly in section, illustrating one way of mounting a double-acting automatic slack adjuster of the type herein referred to in a brake rigging. Fig. 2 is an elevation, partly in section, of parts of this slack adjuster and illustrates one form of the invention. Fig. 3 is a section on line III—III of Fig. 2. Figs. 4 and 5 are detail sections illustrating further forms of the invention. Figs. 6, 7 and 8 are end views of different modified forms of a clutch member forming an essential part of the invention.

In Fig. 1 the slack adjuster, generally denoted by the reference numeral 1, forms part of a pull rod in a brake rigging. The actuating device by which the screw-connection 2 of the slack adjuster is rotated in the slack reducing direction comprises a system of links and levers 3, 4, 5 and is operated by the movements of the brake piston head 6.

The slack adjuster shown in Figs. 2 and 3 is of the type in which a rotatable part 2a provided with the screw-threaded connecting member 2 at the release of the brake is rotated in the slack reducing direction by means of a ratchet wheel 7 and a pawl 8, and in which said pawl 8 is carried on a rotatable casing 9 which by means of cams 10, 11 simultaneously effects disengagement of a friction clutch 12, 13. At the application of the brake the ratchet wheel 7 and the rotatable part 2a on which the ratchet wheel is secured, are released by the pawl 8 so that the rotatable part 2a is free to rotate in the slack increasing direction under the action of the torque arising in the non-selflocking screw connection 2 under the action of the commencing braking stress in the pull rod of which the slack adjuster forms part. Such rotation of the rotatable part 2a can take place until in a predetermined position of the application movement of the brake the cams 10 and 11 allow engagement of the friction clutch 12, 13, whereby the rotation is stopped and a further adjusting movement in the slack increasing direction is prevented. It will be seen that in this type of slack adjuster, which has been illustrated herein as an example only, a rotation of the screw-threaded connecting member 2 in the slack reducing direction is effected at each release of the brake, irrespective of whether the slack is too large or not, and any such slack reducing movement in excess of that necessary for reducing the slack to normal value is compensated at the next braking operation by a corresponding slack increasing movement taking place due to the stresses arising in the brake rigging before engagement of the clutch 12, 13 is allowed by the cams 10, 11. The cam 10 is fixedly secured to the rotatable casing 9, whereas the cam 11 is non-rotatable, and the cam surfaces 10' and 11' are of such a shape that the cams 10, 11 which at released brake hold the clutch member 12 out of contact with the clutch surface 13, allow the clutch member 12 to move into contact with the clutch face 13 in a certain position, corresponding to the desired value of the slack, of the casing 9 at the rotation thereof through the links and levers 3, 4, 5 at the application of the brake.

In the form of the invention illustrated in Fig. 2 the friction clutch consists of a clutch member 12 securely connected with the rotatable part 2a and an annular friction surface 13 provided on a casing 14 having secured thereto an attaching lug 14a. The cooperating clutch elements 12 and 13 are put in and out of engagement with each other by relative axial movement under the action of a spring 15 and the cooperating cams 10, 11, respectively. In the form of Fig. 2 the clutch member 12 consists of an annular flange the outer circumference of which is conical (it could also be made cylindrical, if desired), the clutch surface 13 in the housing 14 also being conical, the conicity of the surface 13, however, being greater than the conicity of the outer circumference of the flange 12, so that only the edge or ridge 16 of the flange 12 will be brought in frictional contact with the surface 13 along a circular line.

Instead of forming a single edge or ridge 16 as illustrated in Fig. 1, the clutch member 12 may be constructed or shaped (stepped) so as to form a number of edges or ridges 16 for frictional contact with the friction surface 13 as illustrated in Fig. 4, the said edges or ridges laying on an imaginary cone of the same conicity as the conical surface 13 so that the member 12 can be brought in frictional contact with the surface 13 along a corresponding number of circular lines.

In the form of the invention illustrated in Fig. 5 the friction surface 13 consists of a planar, annular surface, while the clutch member 12 consists of a flange which on the side facing the surface 13 is provided with a preferably annular ledge 17 forming a ridge 16' which also might be called an edge, only that it is shown as being blunter than the edges 16 shown in Figs. 2 and 4. Obviously also in the form of Fig. 5 as well as in the form of Fig. 4 a plurality of edges or ridges may be provided instead of a single one.

As illustrated in Figs. 6, 7 and 8 by way of example it is possible, by giving the edge or ridge or number of edges or ridges 16 or 16' on the clutch member 12 a corresponding form, to obtain such an eccentric (Fig. 6), or non-circular, for instance oval (Fig. 7) or spiral (Fig. 8), form of the contact line or lines of the clutch member 12 with the friction surface 13 that the action of the edges or ridges against the surface 13 will not give rise to the formation of any groove therein, in case it should be desired to avoid this. It has been found, however, that the small groove that may be formed in the surface 13 by the edges or ridges if these are circular and concentric with the axis of the clutch, is practically harmless.

It has been found that by giving one of the contacting friction surfaces of the friction clutch an edged or ridgelike shape as hereinbefore described the coefficient of friction between the two surfaces will be practically constant independently of the amount or character of lubricant that may be applied on or gain access to the said surfaces, and further it has been found that a poor lubrication or no lubrication at all of the said surfaces will not raise the coefficient of friction between them to such a high value as might jeopardize or disturb the normal function of the slack adjuster for compensating wear of the brake shoes.

While certain embodiments of the invention have been shown and described, it is to be understood that this showing and description are illustrative only, and the invention may not be regarded as limited to the forms shown and described, except by the terms of the appendant claims, as within the scope of the invention many modifications can be made of the examples shown and described. Thus, also the embodiment shown in Fig. 5 may be modified by providing the clutch member 12 with a number of parallel or non-parallel or even radial ridges. The angle formed between the sides of the ridge or edge, or the sharpness of the ridge or edge, may be varied according to the construction material used and the stresses for which it is designed to be subjected during work. The edged or ridged contact surface may be provided on the non-rotatable member 14 and cooperate with a planar or conical or even spherical friction surface on the member 12 connected with the rotatable part 2a.

What I claim and desire to secure by Letters Patent is:

1. In combination with a double-acting automatic slack adjuster of the character described, comprising a non-selflocking screw connection, a controlled friction clutch for stopping rotation of said non-selflocking screw connection in slack increasing direction, comprising two opposed clutch members having facing friction surfaces one of which is edge fashioned for frictional contact of substantially linear character with the other friction surface.

2. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a number of annular edges for frictional contact of substantially linear character with the other friction surface.

3. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is ridged for frictional contact of substantially linear character with the other friction surface.

4. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a number of annular ridges of circular configuration for frictional contact of substantially linear character with the other friction surface.

5. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a number of annular ridges of circular configuration for frictional contact of substantially linear character with the other friction surface, said ridges being concentric in relation to the axis of the clutch.

6. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a number of ridges for frictional contact of substantially linear character with the other friction surface, said ridges being non-parallel to circles concentric in relation to the axis of the clutch.

7. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the form of a number of ridges of spiral configuration for frictional contact of substantially linear character with the other friction surface.

8. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a plurality of ridges for frictional contact of substantially linear character with the other friction surface.

9. In combination with a double-acting slack adjuster of the character described, comprising a non-selflocking screw-connection, a controlled friction clutch for stopping rotation of said non-self-locking screw-connection in slack increasing direction, comprising two opposed clutch members having facing friction surfaces one of which is in the shape of a plurality of concentric, circular ridges of different diameters for frictional contact of substantially linear character with the other friction surface.

10. In combination with a double-acting automatic slack adjuster of the character described, comprising a non-selflocking screw-connection, a controlled friction clutch for stopping rotation of said non-self-locking screw-connection in slack increasing direction, comprising two opposed clutch members one of which has a conical friction surface, and stepped annular ridges on the other clutch member, laying on an imaginary cone of the same conicity as said conical friction surface and adapted for substantially linear frictional contact therewith.

11. In combination with a double-acting automatic slack adjuster of the character described, comprising a non-selflocking screw-connection, a controlled friction clutch for stopping rotation of said non-self-locking screw-connection in slack increasing direction, comprising two opposed clutch members having facing friction surfaces one of which is fashioned for frictional contact of substantially linear character with the other friction surface.

BERT HENRY BROWALL.